United States Patent
Thirumoorthy

(10) Patent No.: US 7,158,632 B2
(45) Date of Patent: Jan. 2, 2007

(54) ADAPTIVE SCALING AND ECHO REDUCTION

(75) Inventor: Hari Thirumoorthy, Lake Forest, CA (US)

(73) Assignee: Intel Corporation, Santa Clara, CA (US)

(*) Notice: Subject to any disclaimer, the term of this patent is extended or adjusted under 35 U.S.C. 154(b) by 304 days.

(21) Appl. No.: 10/644,141

(22) Filed: Aug. 20, 2003

(65) Prior Publication Data

US 2005/0053020 A1    Mar. 10, 2005

(51) Int. Cl.
*H04B 3/23* (2006.01)

(52) U.S. Cl. .................. 379/406.08; 708/301

(58) Field of Classification Search ............... 379/406.08–406.11; 708/301, 818; 333/166; 370/286, 290–292
See application file for complete search history.

(56) References Cited

U.S. PATENT DOCUMENTS

| | | | |
|---|---|---|---|
| 5,029,121 A * | 7/1991 | Kawata et al. | 708/319 |
| 5,559,881 A * | 9/1996 | Sih | 379/406.08 |
| 6,768,796 B1 * | 7/2004 | Lu | 379/406.08 |

* cited by examiner

*Primary Examiner*—Daniel Swerdlow
(74) *Attorney, Agent, or Firm*—Buckley, Maschoff & Talwalkar LLC

(57) ABSTRACT

A method, apparatus, and system for scaling a value of an amplitude to a binary value and a method, apparatus and system for reducing an undesirable portion of a signal.

28 Claims, 9 Drawing Sheets

ADAPTIVE SCALING AND ECHO REDUCTION

BACKGROUND

Audio communications transmitted over a network such as the Internet utilizing Internet Protocol (IP) may be referred to as "voice over IP" communications. When utilizing such voice over IP communications, it sometimes occurs that a speaker speaking into a transmitting device that transmits audio through a node on a network using voice over IP communication will hear his own voice on his receiving device that is intended to receive audio from one or more other nodes on the network. Such receipt of ones own audio transmission may be referred to as "echo."

BRIEF DESCRIPTION OF THE DRAWINGS

The accompanying drawings, wherein like reference numerals are employed to designate like components, are included to provide a further understanding of echo reduction, are incorporated in and constitute a part of this specification, and illustrate embodiments of echo reduction that together with the description serve to explain the principles of echo reduction.

In the drawings.

DETAILED DESCRIPTION

Figure 1:
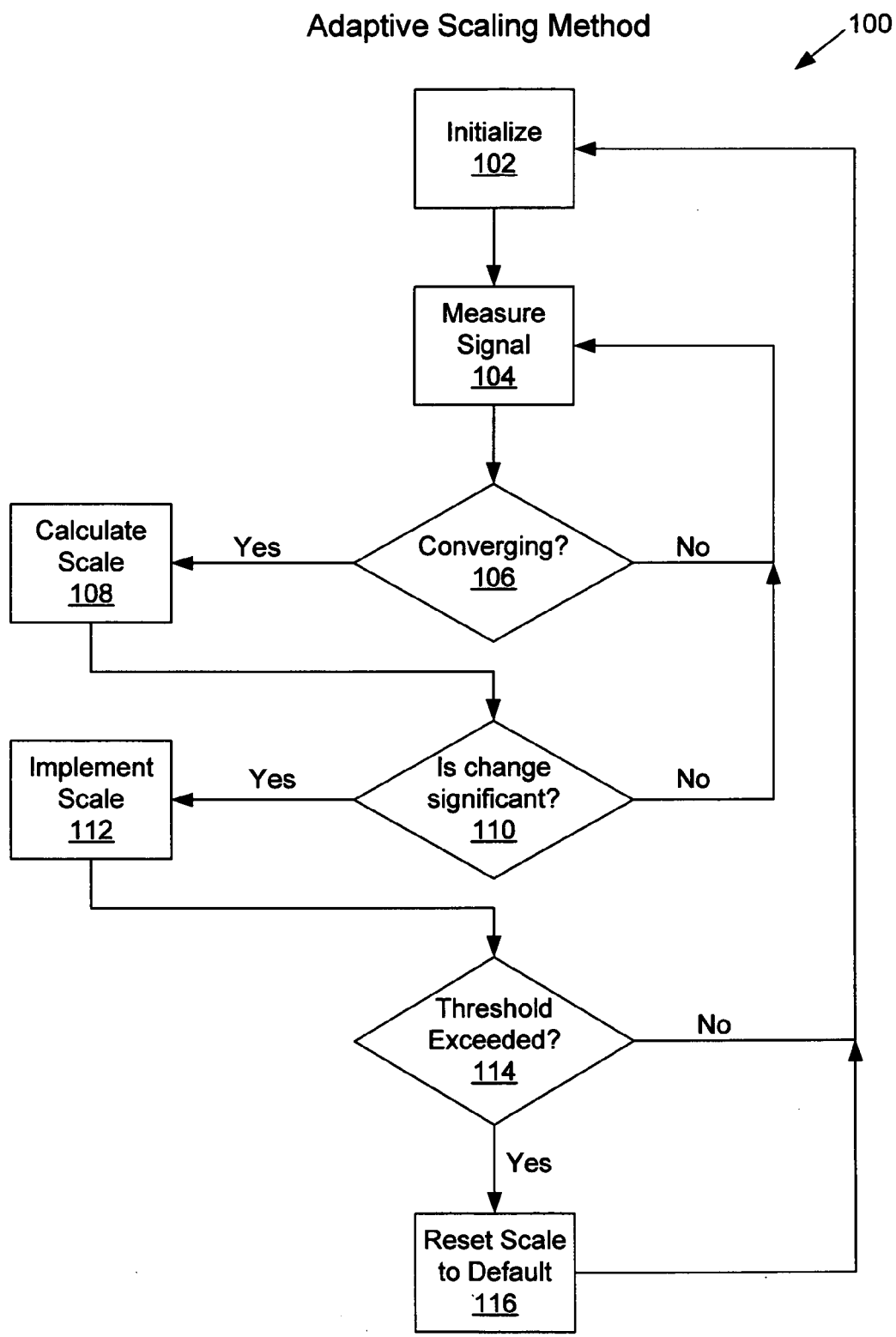
FIG. 1 is a block diagram of an embodiment of a method of adaptively scaling echo signals.

Reference will now be made to embodiments of echo reduction and adaptive scaling in digital communications, examples of which are illustrated in the accompanying drawings. Moreover, those of ordinary skill in the art will appreciate that the echo reduction and adaptive scaling described in connection with voice over IP communications may be equally applicable to other communications including, for example, any digitally transmitted audio signal. Other details, features, and advantages of echo reduction will become further apparent in the following detailed description of embodiments thereof.

Any reference in the specification to "one embodiment," "a certain embodiment," or a similar reference to an embodiment is intended to indicate that a particular feature, structure or characteristic described in connection with the embodiment is included in at least one embodiment of the invention. The appearances of such terms in various places in the specification are not necessarily all referring to the same embodiment. References to "or" are furthermore intended as inclusive so "or" may indicate one or another of the ored terms or more than one ored term.

The present echo reduction and adaptive scaling may be performed in connection with digitally transmitted audio signals or information. That information may carry audio over a computer network such as the Internet, a wide area network (WAN), or a local area network (LAN). Such networks are networks of nodes such as computers, dumb terminals, or other typically processor-based, devices interconnected by one or more forms of communication media. Typical interconnected devices range from telephones, handheld computers and notebook PCs to high-end mainframe and supercomputers. The communication media coupling those devices include twisted pair, co-axial cable, optical fibers and wireless communication techniques such as use of radio frequency.

A node may be any device coupled to the network including, for example, routers, switches, servers, and clients. Nodes may be equipped with hardware, software or firmware used to communicate information over the network in accordance with one or more protocols. A protocol may comprise a set of instructions by which the information signals are communicated over a communications medium. Protocols are, furthermore, often layered over one another to form something called a "protocol stack." In one embodiment, the network nodes operate in accordance with Internet Protocol (IP) as defined by Internet engineering Task Force (IETF) standard 5, Request for Comment (RFC) 791, (IP Specification), adopted in September, 1981 and available from www.ietf.org.

Nodes may operate as source nodes, destination nodes, intermediate nodes or a combination of those source nodes, destination nodes, and intermediate nodes. Information is passed from source nodes to destination nodes, often through one or more intermediate nodes. Information may comprise any data capable of being represented as a digital or analog signal, such as an electrical signal, optical signal, acoustical signal, packet, and so forth. Examples of information in this context may include digital data that represents audio being transmitted, data to be utilized by the node in which the data resides, data to be transferred to another node and utilized therein, and so forth.

Audio communications generally involve at least two participants, at least one of which is transmitting audio and the other is receiving that audio. Often those two or more participants both transmit and receive audio as, for example, occurs in a typical telephone conversation. An audio transmission is often referred to as being transmitted on a transmission path or "Tx." Receipt of the audio transmission is often referred to as being received on a return path or "Rx." Thus, in such a transmission, audio may be incident at a microphone, the microphone may convert the audio signal to a transmitted analog electrical signal, and the analog electrical signal may be converted to a digital signal or set of information that may be transmitted on a digital network by way of, for example, IP packets in voice over IP format. Hardware that includes the microphone, an analog signal handling device, a digital signal handling device, a conversion device, and a transmission device, may be referred to as a transmission node herein. The transmitted audio may then be received at a receiving node that may include hardware similar to that included in the transmission node. The receiving node may thus receive the voice over IP packets, convert the audio information contained in those packets to a received analog electrical signal, and the received analog electrical signal may be converted to an audio signal at a speaker so that the transmitted and received audio signal may be heard by a user of the receiving node. The receiving node may also act as a transmitting node and the transmitting node may act as a receiving node in a similar fashion.

Echo analysis may include determination of delay in the communication which may include the time between transmission at the transmitting node and reception of an audio communication at a receiving node and may include the time between receipt of the audio communication and return of an echo to the transmitting node. Such delay may be caused by activities including conversion of signals, arrangement of digital information into packets, and time required to transmit the packets along the transmit path, often through intermediate nodes. Other causes of delay may include portions of the audio transmission that are communicated by way of wireless transmission, satellite, and long distance transmission over frame relay or asynchronous transfer mode (ATM) networks.

Echo may also be created by leakage between transmit and receive paths at points along the transmission and return paths. Hybrid echo may be caused by an impedance mismatch in a hybrid circuit, such as a circuit utilizing an interface that converts between 2-wire and 4-wire types of transmission.

In a typical telephone system, a handset used for transmitting and receiving audio communications utilizes two wires on which analog audio signals are both transmitted and received. Analog trunk connections often, however, separate the transmit and receive signals onto different transmit and return 2-wire circuits, referred to as 4-wire transmission. In 2-wire transmission systems, transmit and return signals may leak across the common two wire circuit, thereby causing echoes. In 2-wire to 4-wire conversion, hybrid transforms may, for example, cause the return signal incident on the return signal portion of a 4-wire transmission to be reflected onto the transmit signal incident on the transmit signal portion of the 4-wire transmission.

An echo canceller is a device that reduces the level of echo that has leaked from one path to another, such as from the return path to the transmit path. The echo canceller may reduce echo by estimating the echo signal by modeling, for example, an echo portion of a signal on the Rx path. The transmit or return signal may then be adjusted by reducing it by the expected amount of echo so that the signal will be adjusted, by for example subtracting the expected echo from the return signal, at a time when it is estimated that the echo will be incident at the transmitting node. The time delay from transmission to receipt of the echo at the transmitting node may be referred to as "echo delay time." Thus, for example, in a voice communication application wherein a first node and a second node are utilized as both transmitting and receiving nodes, a voice audio signal is transmitted from the first node to the second node. An amount of echo that will return to the first node from that transmission may then be calculated. That echo may then be subtracted from the return path to the first node, which should then be left either with no audio, or a voice communication transmitted from the second node. The second node may operate in a similar fashion to reduce or eliminate echo from second node transmissions.

A finite impulse response (FIR) filter is a type of signal modification element such as a digital signal filter that outputs a modified form of an input signal. The term "finite" indicates there is typically no feedback used within a FIR filter. Throughput of a FIR filter may be high as it may be implemented in assembly language or hardware.

A FIR tap is typically associated with a pair of values representing a coefficient and a delayed input signal sample. A number of FIR taps may be designated as "N," and that number N may be used to determine an amount of memory needed to implement the filter, a number of calculations necessary to implement the filter, and any limitations regarding an amount of filtering that may be performed by a node, based on the capability of that node.

FIR filters may be implemented using fractional arithmetic so that they may be used in connection with small signals having a magnitude of less than 1.0, thus making them appropriate for use with small echo signals.

Echo may be reduced by adaptively reducing finite impulse response (FIR) tap quantization noise, thereby increasing signal to quantization noise ratio and improving speed of convergence in an echo canceller in voice over IP.

A FIR filter may be used to model a hybrid in voice echo cancellation applications. Such a hybrid may be as signal or portion of a signal that causes the echo. Therefore, once the hybrid is modeled, that hybrid may be used to counteract and cancel the echo, thereby reducing or eliminating the echo.

The FIR filter may have, for example, 1024 taps, covering increments of delay in an audio signal up to 128 milliseconds. A sampling rate of 8 kHz may, for example, be used to read the analog signal and convert that analog signal to a digital signal. Moreover, each tap may produce a value for each sample and that value may be held in 16-bits, thereby containing values in the range of −32768 to 32767.

An equation for the output of the FIR filter at time n is $y[n]$=sum over i [where i =0 to N−1]$\{x[n-i]* tap[i]\}$ for some positive integer N. Convergence of the echo canceller FIR filter may be achieved by use of known signal processing methods. A function of the amplitude may be taken. For example, a stochastic gradient least mean square or recursive least squares may be taken of the measured amplitudes. Values associated with taps of the filter should then be similar to the actual impulse response samples of the hybrid causing the echo. Thus the model of the echo may be created.

Assuming a FIR filter having 1024 taps, a hybrid may be modeled using 80 to 200 taps of the FIR filter, which may correspond to 10 to 25 milliseconds of echo, assuming an input signal sampling frequency of 8000 samples per second. It should be recognized that certain taps may have a zero value at any particular time for a given hybrid and voice channel, thus detecting no signal error representing echo at a specific delay. That delay may be determined by multiplying the index of that tap by 125 micro-seconds, for example. In certain applications, such as those in which more than one microphone in, for example, multiple telephone extensions is utilized, the echo may consist of two or more non-overlapping sub-impulse responses each of which results from a separate hybrid associated with a separate telephone, and all of which combine to form voice communications emanating from a single node. Recognizing that there may be multiple sub-impulse responses, it becomes desirable for the FIR filter to have a large number of non-zero taps (for example, greater than 512 non-zero taps), which may be adapted using adaptive filter techniques until locations of active non-zero taps are determined with a high degree of confidence.

Thus, if the desired tap is "t'[i]" and the implemented tap is "t[i]," then the quantization noise "q[i]" may be represented by calculating the absolute value of the difference between the desired tap and the implemented tap, which may be represented by $q[i]=|t'[i]-t[i]|$. The total quantization noise may then be $y[n]$ wherein $y[n]$ is equal to the sum over i, where i=0 to N−1 of $\{q[i]\}$.

Where N is large, for example, 1024 taps, and recognizing that q[i] terms will all be positive, and thus will not cancel each other but rather may be added to find quantization noise, it may be beneficial to minimize quantization noise values by adaptively scaling those values.

Thus, for example, for a given voice channel the highest normal, or maximum amplitude of a value associated with any tap may be plus or minus 0.25 volts. Then the maximum possible range of numbers that may be represented in connection with a tap, assuming 16-bits of precision, is −32768 to 32767. The value 32767 may then be set to represent 0.25 volts and the value −32767 may be set to represent −0.25 volts. That provides a resolution of 0.25/32767, or 7.62 microvolts.

For another voice channel, the highest normal or maximum amplitude of any tap may be plus or minus 1.0 volts. Then the maximum possible number that may be held by a tap of that voice channel, again assuming 16-bits of precision, of 32767 may represent 1.0 volt, with −32767 representing −1.0 volt. That provides a resolution of 1.0/32767, or 30.51 microvolts.

Recognizing that a tap should hold a value that represents the highest real amplitude value that is occurring and also that improved resolution occurs where the highest tap value represents the smallest possible amplitude, it may be desirable to dynamically scale the amplitudes being experienced to the range of values that may be held by the tap. Thus, the echo canceller may assume that the maximum amplitude of any tap is plus or minus 1.0 volt, sample actual values of a signal to determine whether a maximum actual amplitude is at a level less than 1.0 volt, determine the maximum actual amplitude expected to be received based on the actual amplitude sensed in the sampling, and reset the tap precision to a value less than 1.0 volt to provide improved resolution, resulting in better echo cancellation and faster speed of convergence.

FIG. 1 illustrates a method of adaptively scaling values associated with echo canceller taps 100. That method of adaptively scaling values associated echo canceller taps 100 may find an optimal scale for echo amplitude to provide optimal resolution when that amplitude is to be held in a specific number of bits, which may be used in echo reduction. For example, when an analog signal is sampled and that analog signal includes an echo represented by an amplitude and the echo amplitude is to be identified by a FIR filter and held in a 16-bit word, then highest resolution may be achieved for the echo by scaling the actual values associated with echo canceller taps to the value that may be held in the 16-bit word.

Thus the word, or plurality of bits, may be proportionally scaled such that a maximum positive binary value that may be represented by that plurality of bits represents approximately the maximum of the absolute values of one or more echo canceller taps being considered. The range may include both positive and negative values where, for example, the plurality of bits includes a sign bit. Accordingly, the plurality of bits may proportionately hold a range from negative the absolute value of the approximate actual maximum amplitude to the absolute value of the approximate actual maximum amplitude, or a close approximation of those amplitude values.

At 102, the echo canceller tap scaling is initialized so that scaling may be recalculated, thereby giving the echo canceller tap scaling an adaptive quality. During initialization, a value or variable such as OptimumScale may be set to false or zero to indicate that a new optimum scale has not been calculated and a value or variable such as TapUpdateTime may be set to zero. During an initial operation of the method, a maximum amplitude expected to be incident on the signal may also be set at an initial or default maximum amplitude.

At 104, the echo canceller taps are measured. One or more most recently measured echo amplitudes may be considered to determine an actual maximum amplitude. That actual maximum amplitude may be normalized, approximated, set at a predetermined portion of a sample or otherwise manipulated to eliminate anomalous values such that the approximate actual maximum amplitude of the signal is an amplitude under which a desired portion of the actual amplitude of the samples fall. The actual maximum amplitude may be used in place of the initial maximum amplitude, once measured.

At 106, a determination is made as to whether the echo canceller filter is converging to a true hybrid impulse response. A true hybrid impulse response is one that accurately describes the process by which the current echo is being created. If the echo signal is not converging to a true hybrid, then additional measurements may be measured and signal measurement 104 may be repeated. If the echo signal is converging to a true hybrid, then scaling may be determined.

A factor that may be considered when determining whether the echo canceller filter is converging to a true hybrid impulse response is the time since scaling was last updated. It may be desirable to prevent changes in scaling from occurring in less than, for example, 500 milliseconds. To accomplish that, a time interval may be set between calculations of echo canceller tap levels, which may be obtained, for example, by way of a clock or by counting a predetermined number of input signal samples to the echo canceller filter. In the present example, TapUpdateTime will be incremented and checked each cycle of the method of adaptively scaling echo signals 100 to assure that 500 milliseconds has elapsed since the last scale was implemented.

A minimum change in scaling factor may also be set so that if a new scale is calculated, but that scale is within a desired range, such as a preset hysteresis range, then the new scale may be rejected and the current scale retained. If the new scale is outside of the hysteresis range, either higher or lower than the current scale, then OptimumScale may be set to true or one to indicate that a new scale should be implemented.

At 108, if a new scale is desired, that new scale may be calculated by dividing the maximum value that can be represented in the plurality of bits utilized by the echo canceller by the current approximate maximum value of the echo canceller taps. The maximum echo magnitude may be normalized to clip extraneously high magnitude readings while keeping all measurements that are within the range in which echo falls. The value or variable OptimumScale may also be set to true or one indicating that a new scale has been calculated so that the new scale may then be implemented.

At 110, a determination is made as to whether the change in scale is significant. A significance threshold may be set that may be, for example, a fixed amount of change in scaling or a percentage change in scaling and a significant change could then be any change greater than the significance threshold. That significance threshold may furthermore act both for increases and decreases in scaling or for either increases or decreases. If the significance threshold is not exceeded, then it has been determined that the change is not significant and the scaling will not be updated at 112.

At 112, the scale is implemented by applying it to the echo canceller taps. Because the echo canceller taps are scaled to maximize the set of bits in which the echo canceller taps will be stored, resolution of the echo canceller taps will be optimized.

At 114, if the threshold has been exceeded, then the scaling may be reset to a maximum predefined value such as, for example, 1.0 volt at 116 and scaling may be re-performed in a next iteration to find an appropriate scale less than the 1.0 volt default. That default may also be used as an initial scaling value when the method of adaptively scaling echo signals 100 is first performed. In practice, exceeding such a threshold may not occur and so establishing and checking such a threshold may not be necessary.

An article of manufacture that includes a computer readable medium having stored thereon instructions that cause a processor to perform that method of adaptively scaling echo signals when those instructions are executed may also be constructed.

Figure 2:
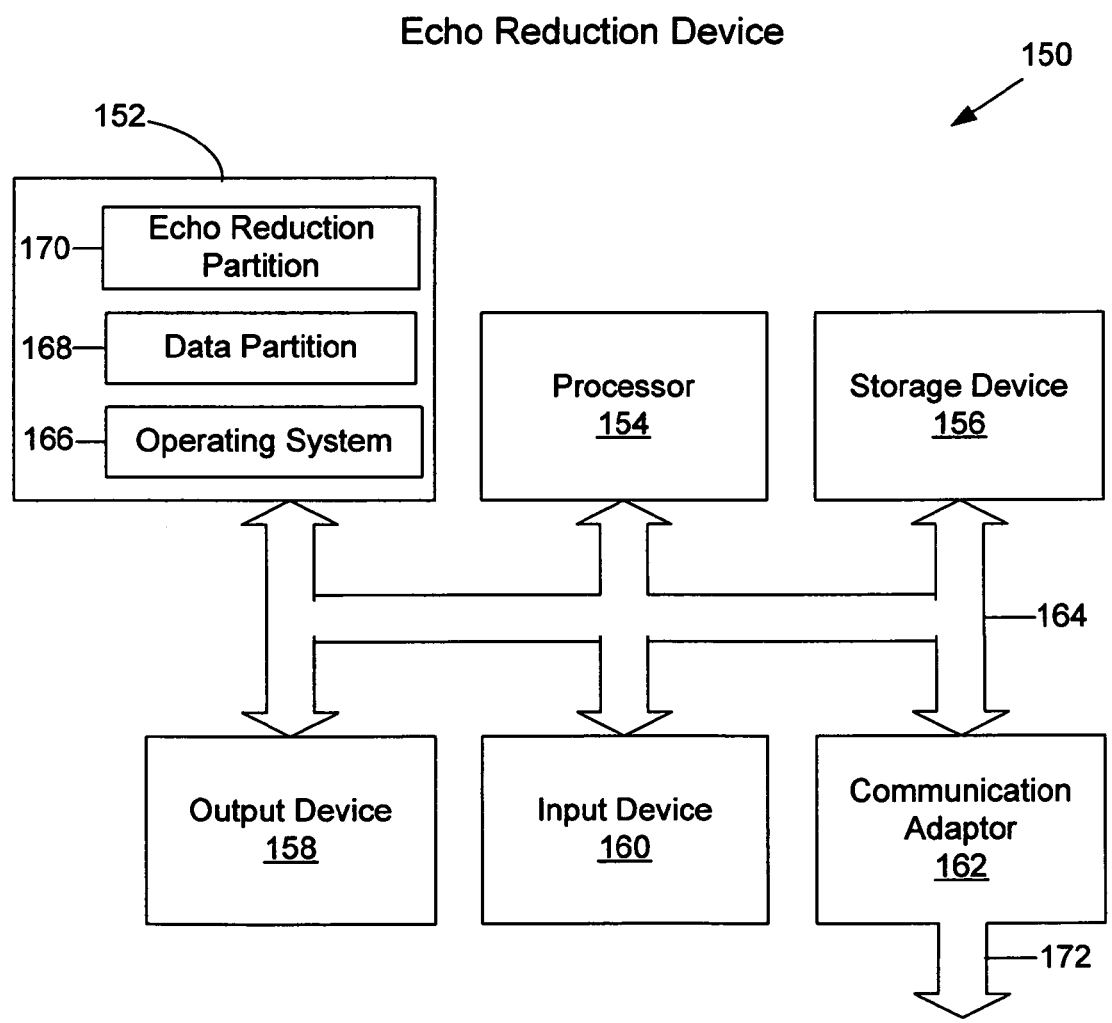
FIG. 2 is an embodiment of a processor based echo reduction device.

FIG. 2 illustrates a processor based echo reduction device 150 that may be used to reduce an echo portion of a signal. That processor based echo reduction device 150 includes memory 152, a processor 154, a storage device 156, an output device 158, an input device 160, and a communication adaptor 162. It should be recognized that any or all of the components 152-162 of the processor based echo reduction device 150 may be implemented in a single machine. For example, the memory 152 and processor 154 might be combined in a state machine or other hardware based logic machine.

Communication between the processor 154, the storage device 156, the output device 158, the input device 160, and the communication adaptor 162 may be accomplished by way of one or more communication busses 164. It should be recognized that the processor based echo reduction device 150 may have fewer components or more components than shown in FIG. 2. For example, if information storage after device de-energization is not desired, the storage device 156 may not be included with the processor based echo reduction device 150.

The memory 152 may, for example, include random access memory (RAM), dynamic RAM, and/or read only memory (ROM) (e.g., programmable ROM, erasable programmable ROM, or electronically erasable programmable ROM) and may store computer program instructions and information. The memory 152 may furthermore be partitioned into sections including an operating system partition 166, wherein instructions may be stored, a data partition 168 in which data may be stored, and an echo reduction partition 170 in which instructions for echo reduction and stored information related to such echo reduction may be stored. The echo reduction partition 170 may also allow execution by the processor 154 of the instructions to perform the instructions stored in the echo reduction partition 170. The data partition 118 may furthermore store data to be used during the execution of the program instructions such as, for example, audio information that is being formatted for or retrieved from one or more packets.

The processor 154 may execute the program instructions and process the data stored in the memory 152. In one embodiment, the instructions are stored in memory 152 in a compressed and/or encrypted format. As used herein the phrase, "executed by a processor" is intended to encompass instructions stored in a compressed and/or encrypted format, as well as instructions that may be compiled or installed by an installer before being executed by the processor.

The storage device 156 may, for example, be a magnetic disk (e.g., floppy disk and hard drive), optical disk (e.g., CD-ROM) or any other device or signal that can store digital information. The communication adaptor 162 may permit communication between the processor based echo reduction device 150 and other devices or nodes coupled to the communication adaptor 162 at a communication adaptor port 172. The communication adaptor 162 may be a network interface that transfers information from nodes 206 and 208 on a network such as the network 200 illustrated in FIG. 3, to the processor based echo reduction device 150 or from the processor based echo reduction device 150 to nodes 206 and 208 on the network 200. The network in which the processor based echo reduction device 150 operates may alternately be a LAN, WAN, or the Internet. It will be recognized that the processor based echo reduction device 150 may alternately or in addition be coupled directly to one or more other devices through one or more input/output adaptors (not shown).

The processor based echo reduction device 150 may also be coupled to one or more output devices 158 such as, for example, a speaker, a monitor or printer, and one or more input devices 160 such as, for example, a microphone, keyboard, or mouse. It will be recognized, however, that the processor based echo reduction device 150 does not necessarily need to have all of those output devices 158 or input devices 160 to operate.

The elements 152,154,156,158,160, and 162 of the processor based echo reduction device 150 may communicate by way of one or more communication busses 164. Those busses 164 may include, for example, a system bus, a peripheral component interface bus, and an industry standard architecture bus.

Figure 3:
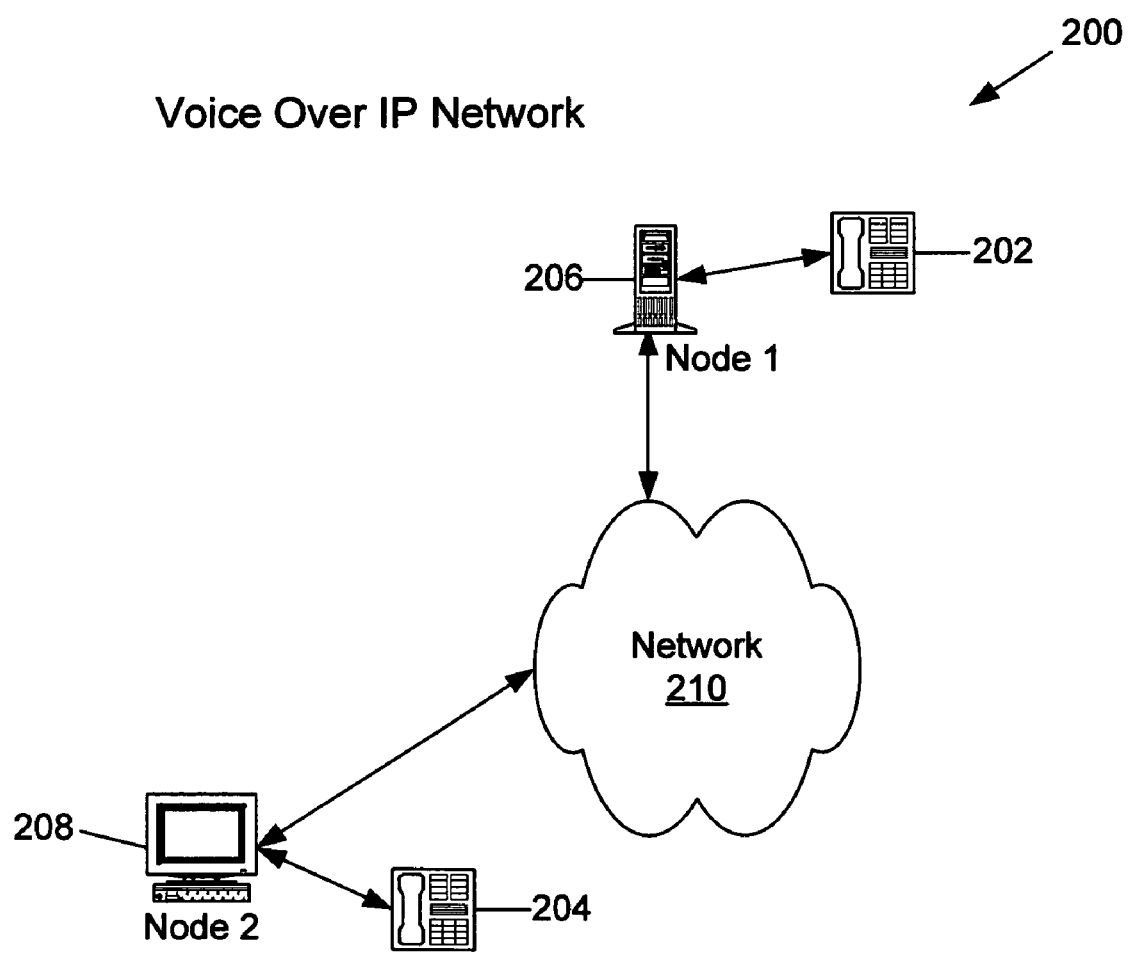
FIG. 3 is an embodiment of a voice over IP network in which an echo reduction device may be implemented.

FIG. 3 illustrates a voice over IP network 200 in which an echo reduction device may be implemented. The voice over IP system illustrated includes two telephony devices 202 and 204 that are coupled to first and second nodes 206 and 208 respectively. The first node 206 and second node 208 are also coupled to a network 210 to form a voice over IP telephony network 200.

Telephony devices that include echo reduction may be, for example, telephones that are wired to a network, wireless or cordless telephones, two-way radios, or other telephones.

Figure 4:
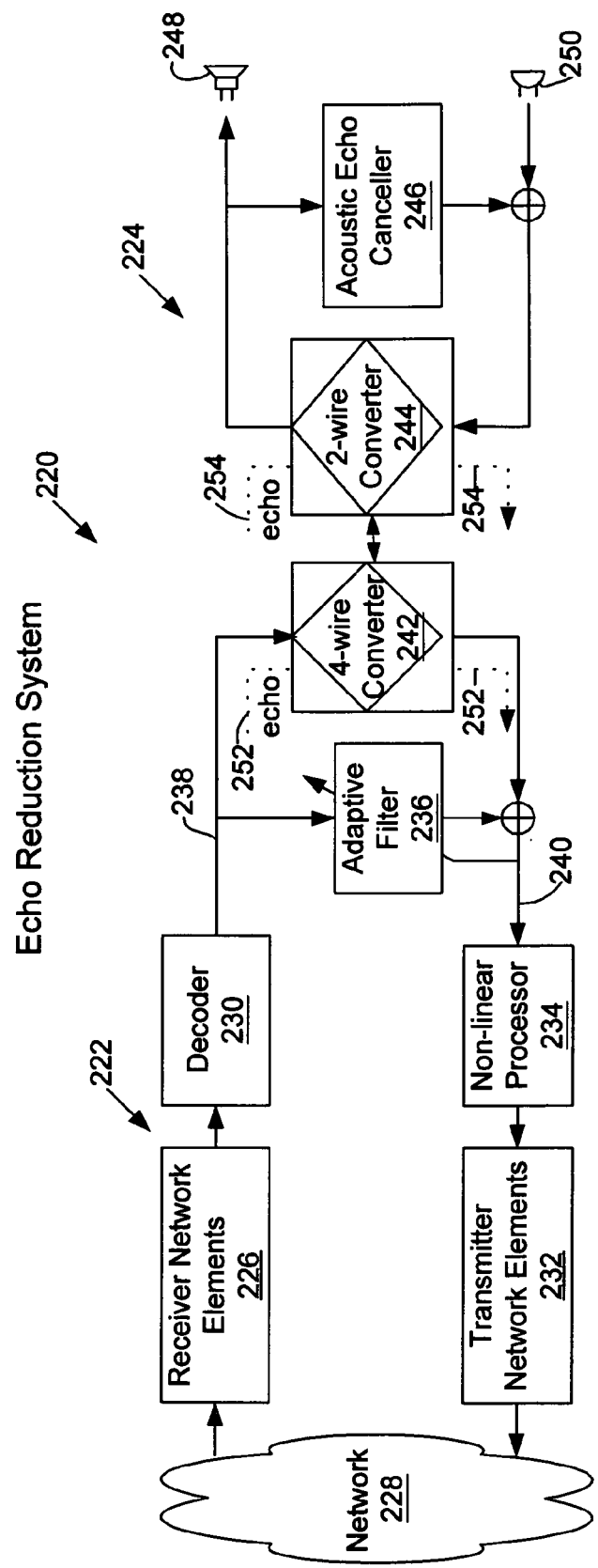
FIG. 4 is an embodiment of an echo reduction system in which echo scaling may be implemented.

FIG. 4 illustrates an echo reduction system 220 in which echo scaling may be implemented. The echo reduction system 220 includes a 4-wire transmission circuit 222 and a 2-wire transmission circuit 224. Alternately, coaxial cable, wireless communication through radio waves, or other coupling of varying forms of communication may be coupled, causing hybrid echo. Hybrid echoes may be reflected signals caused, for example, by the coupling of various forms of communication.

The 4-wire transmission circuit 222 includes receptor network elements 226 coupled to a digital network 228 to receive digital audio transmissions. A decoder 230 receives the audio information from the receptor network elements 226 and converts that digital information into an analog signal. Transmitter network elements 232 receive audio information from a non-linear processor 234 and transmit that audio information to the network 228. The non-linear processor 234 may be activated in single-talk mode, when only one person is speaking, to reduce undesirable signal attributes. The transmitter network elements 232 may also convert an analog audio signal to digital audio information.

An adaptive filter 236 may be implemented between a return portion 238 and a transmit portion 240 of the 4-wire transmission circuitry. That adaptive filter may include a signal modification element, a scaling element and a signal reduction element. The signal reduction element may implement adaptive scaling of, for example, echo canceller taps in audio communications. The adaptive filter may then scale the echo canceller taps to fit within a plurality of bits associated with the adaptive filter, such as may be included in a filter tap. The adaptive filter thus reduces an echo component embedded in a signal input into the adaptive filter.

The 4-wire transmission circuit may be coupled to the 2-wire transmission circuit by way of converters 242 and 244 and echo hybrids may be created by that conversion.

An acoustic echo canceling device 246 is incorporated into the 2-wire communication circuit. A speaker 248 and a microphone 250 may be coupled to the 2-wire communication circuit to output and input audio respectively. The acoustic echo canceling device 246 may reduce echo caused, for example, by feedback received at the microphone 250 from the speaker 248. It may be noted that adaptive scaling and echo reduction, as described herein, is applicable to the acoustic echo canceling device 246.

Reflections that cause echoes may commonly occur between the 4-wire converter 242 and the adaptive filter 236, as indicated at 252, and also between the 2-wire converter 244 and the adaptive filter 236, as indicated at 254.

A voice over internet protocol communication device may incorporate some or all of the elements of the echo reduction system 220 to reduce echo in audio communications.

Figure 5:
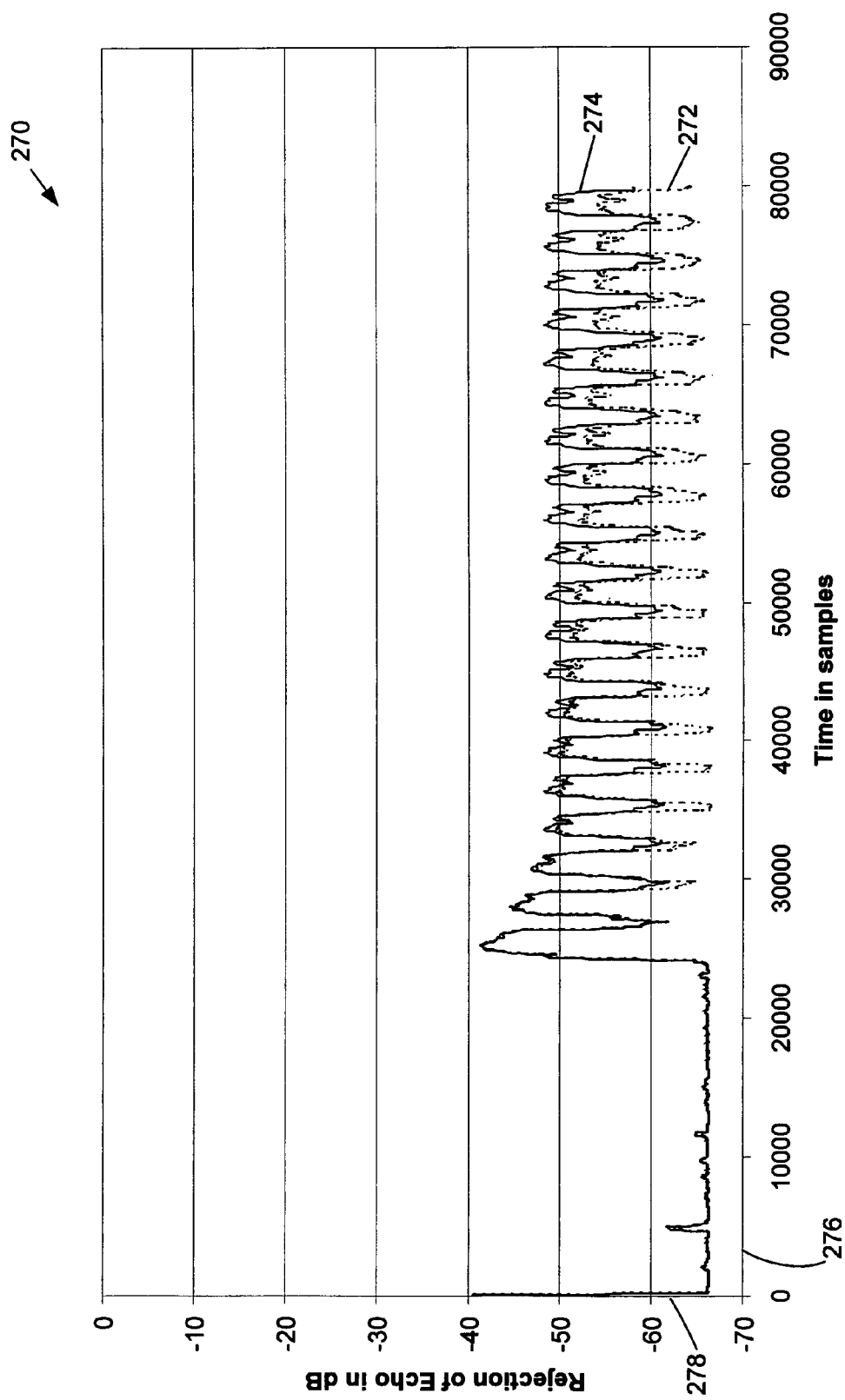
FIG. 5 is a graph of echo rejection using adaptive scaling and without adaptive scaling on a hybrid of 23 dB.

FIG. 5 illustrates a graph of an echo reduction system operating when the hybrid has an inherent echo return loss of 23 dB 270, depicting residual echo remaining after echo cancellation when using adaptive scaling at 272 and residual echo remaining after echo cancellation without adaptive scaling at 274. The graph of FIG. 5 was created utilizing a sampling of a signal similar to the ITU G.168 standard, test 2B based, voice communication signal. The hybrid delay was 40 milliseconds and the hybrid echo return loss was 23 dB. The ITU G.168 standard, including the standard tests illustrated in FIGS. 5 and 6, may be found by subscribing to the International Telecommunications Union at http://www.itu.int/home/index.html. The ITU standard was copyrighted in June 2002. The horizontal axis 276 of the graph 270 of FIG. 5 indicates passage of time in samples taken. The vertical axis 278 of the graph 270 of FIG. 5 indicates echo rejection in decibels. The upper signal 274 illustrates residual echo remaining after echo cancellation without adaptive scaling and the lower signal 272 illustrates residual echo remaining after echo cancellation with adaptive scaling. As may be seen, echo is reduced more utilizing echo cancellation with adaptive scaling.

Figure 6:
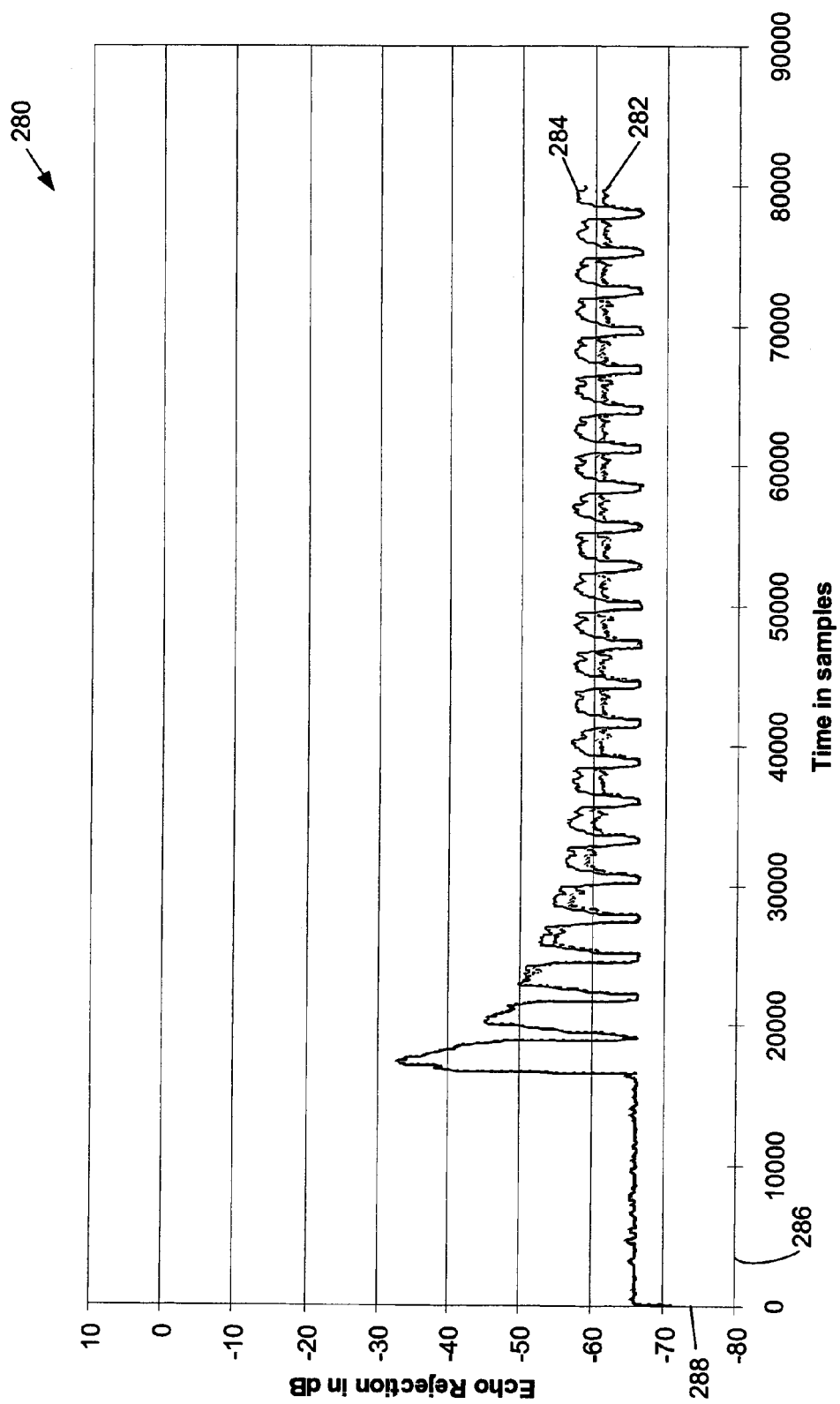
FIG. 6 is a graph of echo rejection using adaptive scaling and without adaptive scaling on a hybrid of 18 dB.

FIG. 6 illustrates a graph of an echo reduction system operating when the hybrid has an inherent echo return loss of 18 dB 280. FIG. 6 depicts residual echo remaining after echo cancellation when using adaptive scaling at 282 and residual echo remaining after echo cancellation without adaptive scaling at 284. Like the graph of FIG. 5, the graph of FIG. 6 was created utilizing a sampling of a signal similar to the ITU G.168 standard, test 2B based, voice communication signal. The hybrid delay utilized was 40 milliseconds and the hybrid echo return loss was 18 dB. The horizontal axis 286 of the graph 280 of FIG. 6 indicates passage of time in samples taken. The vertical axis 288 of the graph 280 of FIG. 6 indicates echo rejection in decibels. The upper signal 284 illustrates residual echo remaining after echo cancellation without adaptive scaling and the lower signal 282 illustrates residual echo remaining after echo cancellation with adaptive scaling. As may be seen, echo is reduced more utilizing echo cancellation with adaptive scaling in this test as well as the test illustrated in FIG. 5.

Figure 7:
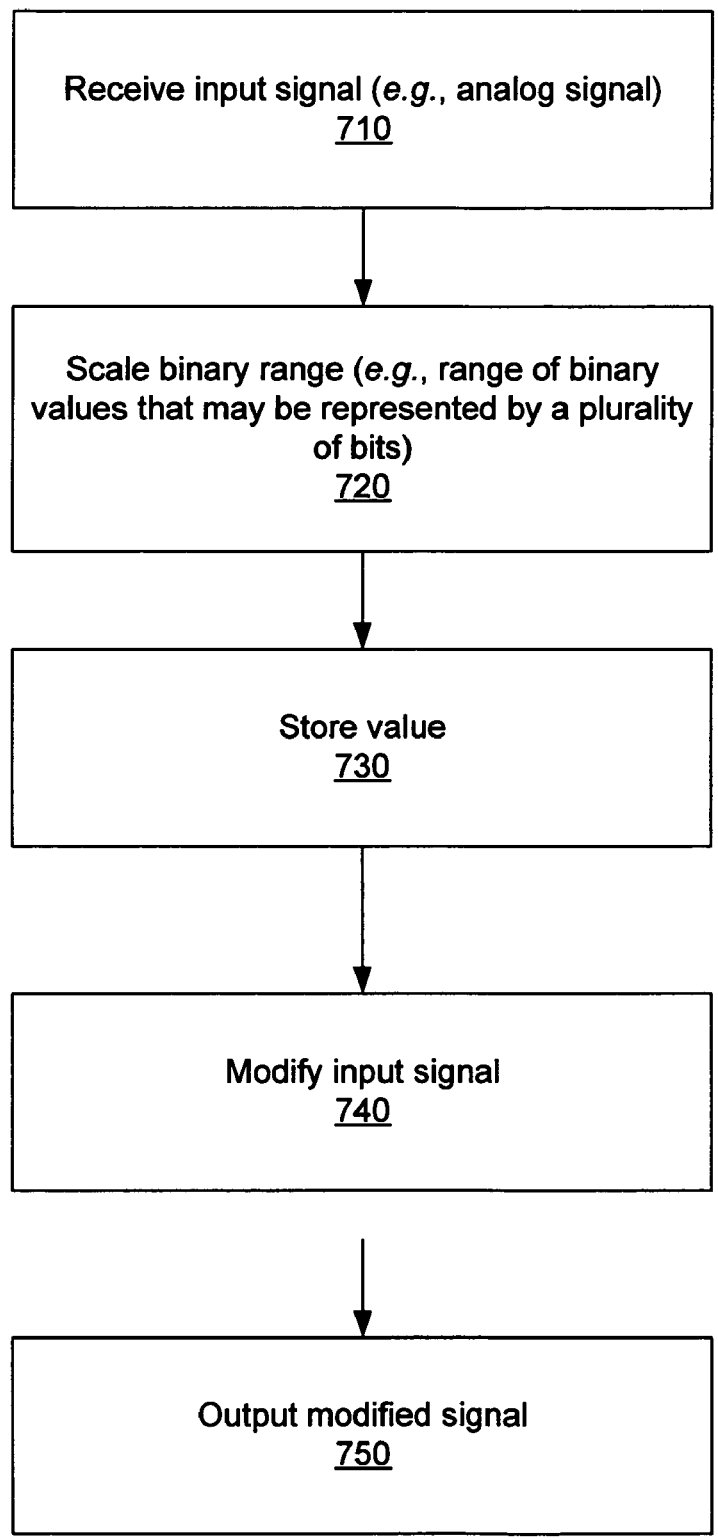
FIG. 7 illustrates a signal modification method according to some embodiments.

FIG. 7 illustrates a signal modification method according to some embodiments. At 710, an input signal is received (eg., an analog signal may be received at an input of a filter). At 720, a binary range is scaled. The binary range may be, for example, associated with one or more taps of the filter and be scaled to a value of a high amplitude of a portion of that input signal. Note that the binary range may be a range of binary values that may be represented by a plurality of bits. At 730, a value is stored. For example, a value corresponding to a second portion of the input signal may be stored in association with one of the taps according to the scale. At 740, the input signal is modified (e.g., by an amount commensurate with the stored portion of the input signal). At 750, the modified signal is output (e.g., from the filter).

Figure 8:
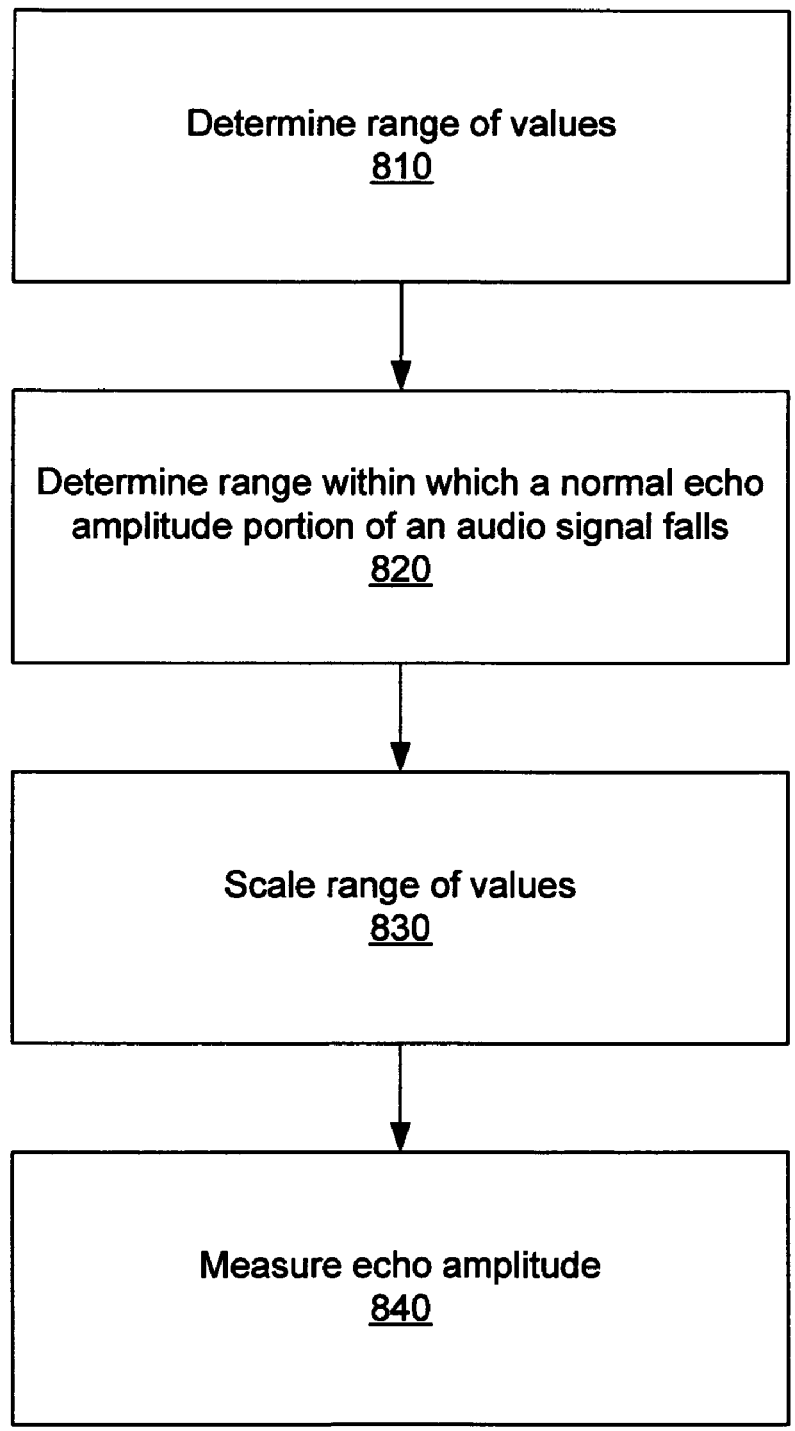
FIG. 8 illustrates a method of scaling a value associated with a finite impulse response filter tap to an echo amplitude according to some embodiments.

FIG. 8 illustrates a method of scaling a value associated with finite impulse response filter tap to an echo amplitude according to some embodiments. At 810, a range of values that may be held in binary in association with the tap is determined. At 820, a range within which a normal echo amplitude portion of an audio signal falls may be determined. At 830, the range of values that may be held in binary in association with the tap may be scaled to the range within which normal echo amplitude falls. At 840, an echo amplitude is measured. For example, the echo amplitude may be measured using the finite impulse response filter and storing a value corresponding to the magnitude of the measured amplitude associated with the filter tap based on the scale.

Figure 9:
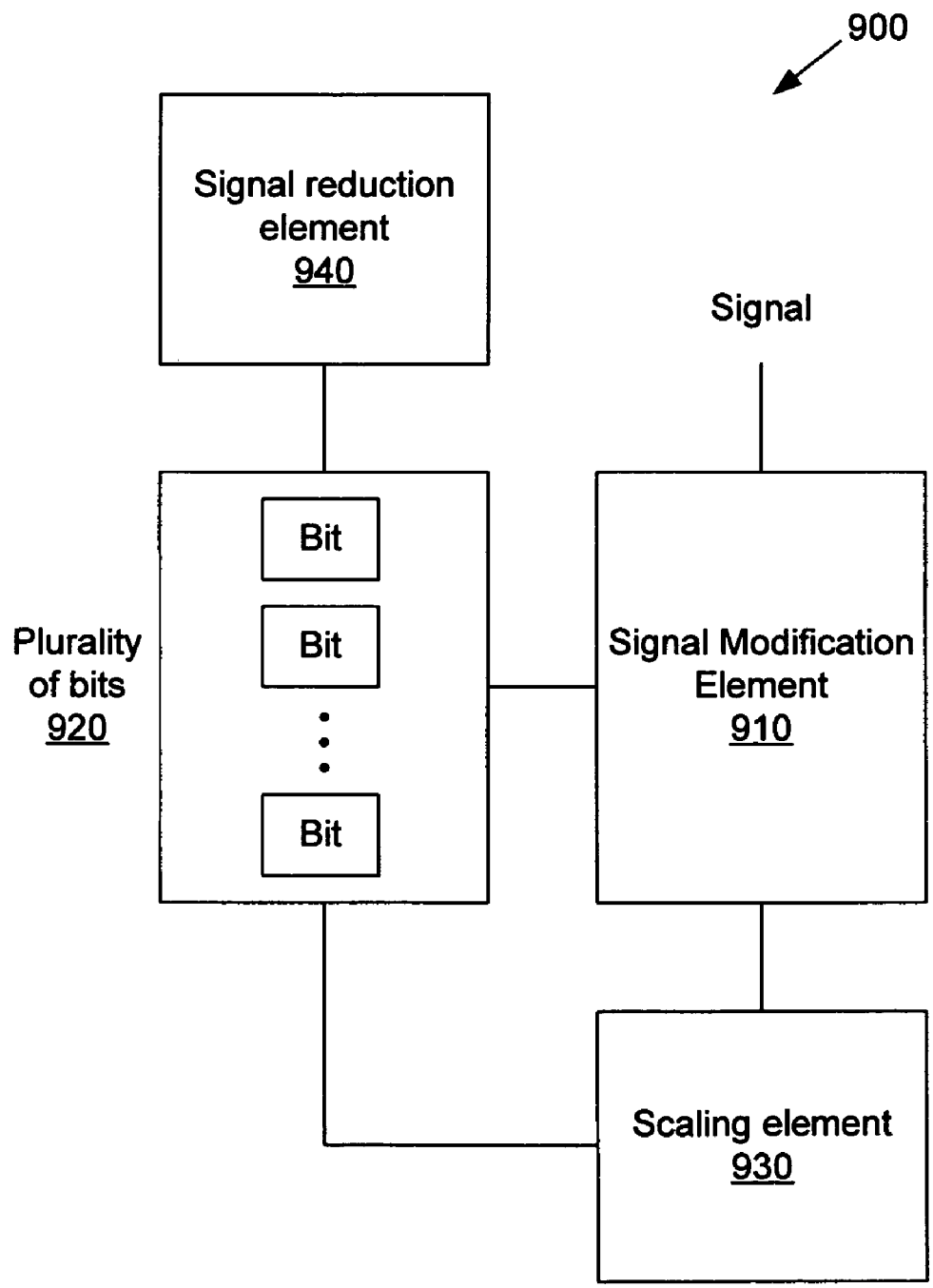
FIG. 9 illustrates a device according to some embodiments.

FIG. 9 illustrates a device 900 according to some embodiments. In particular, the device 900 includes a signal modification element 910 coupled to a signal. The device 900 may also include a plurality of bits 920 coupled to the signal modification element 910 (and the plurality of bits may have a range of values that may be held therein). The device 900 may further include a scaling element 930 coupled to the signal modification element 910 and the plurality of bits 920. The scaling element 930 might, for example, scale a first amplitude measured at the signal modification element 910 to the range of values that may be held in the plurality of bits 920 and store a value that represents a second measured amplitude in the plurality of bits 920 according to that scale. In addition, the device 900 may include a signal reduction element 940 coupled to the plurality of bits 920.

While the systems, apparatuses, and methods of echo reduction and scaling have been described in detail and with reference to specific embodiments thereof, it will be apparent to one skilled in the art that various changes and modifications can be made therein without departing from the spirit and scope thereof. Thus, it is intended that the echo reduction systems, apparatuses, and methods cover modifications and variations provided they come within the scope of the appended claims and their equivalents.

What is claimed is:

1. A signal modification method, comprising:
   receiving an input signal at an input of a filter;
   sensing a high amplitude of a first portion of an input signal;
   determining a scaling value based on a value of the high amplitude;
   scaling a binary range associated with one or more taps of the filter to the scaling value;
   storing a value corresponding to a second portion of the input signal in association with one of the taps according to the scale; and
   modifying the input signal by an amount commensurate with the stored portion of the input signal.

2. The method of claim 1, wherein the received signal is an analog signal.

3. The method of claim 1, wherein the filter is a finite impulse response filter.

4. The method of claim 1, wherein an amplitude of the second portion of the input signal is stored.

5. The method of claim 4, wherein the amplitude is an amplitude of an echo component of an audio signal.

6. The method of claim 1, further comprising outputting the modified signal from the filter.

7. The method of claim 1, wherein the high amplitude is an amplitude under which a desired portion of one or more actually measured amplitudes of the input signal fall.

8. The method of claim 1, wherein the binary range is a range of binary values that may be represented by a plurality of bits.

9. The method of claim 1, wherein the binary range is scaled proportionately.

10. The method of claim 1, further comprising scaling the plurality of bits proportionately such that a negative binary value that may be represented by that plurality of bits represents the negative of the absolute value of the high amplitude and a positive binary value that may be represented by that plurality of bits represents the absolute value of the high amplitude.

11. The method of claim 10, wherein the negative binary value is the largest negative binary value that may be held by the plurality of bits and the positive binary value is the largest positive binary value that may be held by the plurality of bits.

12. The method of claim 1, wherein the high amplitude is a largest of a plurality of measured amplitudes of an echo in an audio transmission.

13. The method of claim 1, wherein the high amplitude is a function of a sampling of a plurality of actually measured amplitudes of echo in an audio transmission.

14. A method of scaling a value associated with a finite impulse response filter tap to an echo amplitude, comprising:
   determining a range of values that may be held in binary in association with the tap;
   sensing a high value of the range of values;
   determining a scaling value based on the high value of the range of values; and
   scaling the range of values that may be held in binary in association with the tap to the scaling value.

15. The method of claim 14, further comprising measuring echo amplitude using the finite impulse response filter and storing a value corresponding to the magnitude of the measured amplitude in association with the filter tap based on the scale.

16. The method of claim 14, further comprising reducing the audio signal by the amplitude associated with the filter tap.

17. A device, comprising:
   a signal modification element coupled to a signal;
   a plurality of bits coupled to the signal modification element, the plurality of bits having a range of values that may be held therein;
   a scaling element coupled to the signal modification element and the plurality of bits to sense a high amplitude of the range of bits, determine a scaling value based on a value of the high amplitude, scale a first amplitude measured at the signal modification element to the scaling value and store a value that represents a second measured amplitude in the plurality of bits according to that scale; and
   a signal reduction element coupled to the plurality of bits.

18. The device of claim 17, wherein the signal modification element is a digital signal filter.

19. The device of claim 17, wherein the signal modification element is a finite impulse response filter.

20. The device of claim 19, wherein the finite impulse response filter is coupled to an audio signal to measure an echo portion of that audio signal.

21. The device of claim 20, wherein the plurality of bits is associated with a tap of the finite impulse response filter.

22. The device of claim 17, wherein the signal modification element is coupled to a first signal and the signal reduction element is coupled to a second signal.

23. A voice over internet protocol communication device, comprising:
   a digital audio receiver;
   a digital to analog decoder coupled to the digital audio receiver;
   an adaptive filter having an input to couple to a first signal to be received from the digital to analog decoder; that is to sense a high amplitude of the first signal, determine a scaling value based on a value of the high amplitude, scale a range of values that may be held in a plurality of bits associated with the adaptive filter to the scaling value, store a second amplitude incident on the first signal in the plurality of bits in accordance with the scale; and having an output to transmit a second signal that is equivalent to the first signal reduced by the second amplitude;
   an analog to digital converter coupled to the second signal; and
   a digital audio transmitter coupled to the analog to digital converter.

24. The voice over internet protocol communication device of claim 23, wherein the digital to analog decoder converts digital audio information received at the digital audio receiver to a corresponding analog audio signal.

25. The voice over internet protocol communication device of claim 23, wherein the analog to digital converter converts an analog audio signal to corresponding digital audio information to be transmitted by the digital audio transmitter.

26. An article of manufacture comprising:
   a computer readable medium having stored thereon instructions which, when executed by a processor, cause the processor to:
      determine a range of values that may be held in binary by a plurality of bits;
      sense a high value of the range of values;
      calculate a scaling value based on the high value of the range of values, wherein the calculated scaling value may represent one of at least three potential scaling values; and
      scale the range of values that may be held in binary in association with the tap to the scaling value.

27. The article of manufacture of claim 26, wherein the instructions further cause the processor to measure an echo amplitude and store a value corresponding to the magnitude of the measured amplitude in the plurality of bits based on the scale.

28. The method of claim 26, wherein the instructions further cause the processor to reduce a signal by the amplitude associated with a filter tap.

* * * * *